(12) United States Patent
Ahn

(10) Patent No.: US 10,579,074 B2
(45) Date of Patent: Mar. 3, 2020

(54) PROPELLER-ENCLOSED AIRLIFTING AIR TUBE APPARATUS

(71) Applicant: Youngsub Ahn, Santa Clara, CA (US)

(72) Inventor: Youngsub Ahn, Santa Clara, CA (US)

( * ) Notice: Subject to any disclaimer, the term of this patent is extended or adjusted under 35 U.S.C. 154(b) by 715 days.

(21) Appl. No.: 15/282,734

(22) Filed: Sep. 30, 2016

(65) Prior Publication Data

US 2018/0093766 A1 Apr. 5, 2018

(51) Int. Cl.
| | |
|---|---|
| *G05D 1/10* | (2006.01) |
| *B64C 17/02* | (2006.01) |
| *B64C 11/48* | (2006.01) |
| *B64C 11/00* | (2006.01) |
| *G05D 1/00* | (2006.01) |
| *G05D 1/08* | (2006.01) |
| *B64C 39/02* | (2006.01) |
| *B64C 19/00* | (2006.01) |
| *B64C 27/20* | (2006.01) |

(52) U.S. Cl.
CPC ............ *G05D 1/102* (2013.01); *B64C 11/001* (2013.01); *B64C 11/48* (2013.01); *B64C 17/02* (2013.01); *B64C 19/00* (2013.01); *B64C 27/20* (2013.01); *B64C 39/024* (2013.01); *G05D 1/0011* (2013.01); *G05D 1/0858* (2013.01); *B64C 2201/027* (2013.01); *B64C 2201/042* (2013.01); *B64C 2201/141* (2013.01); *B64C 2201/146* (2013.01)

(58) Field of Classification Search
CPC .... G05D 1/102; G05D 1/0011; G05D 1/0858; B64C 11/001; B64C 11/48; B64C 17/02; B64C 19/00; B64C 27/20; B64C 39/024; B64C 2201/027; B64C 2201/042; B64C 2201/141; B64C 2201/146

USPC ............................................. 244/23 R, 23 A
See application file for complete search history.

(56) References Cited

U.S. PATENT DOCUMENTS

| | | | |
|---|---|---|---|
| 8,857,754 B2 | 10/2014 | Ferrari et al. | |
| 9,073,532 B2 * | 7/2015 | Pedersen | ................ B60V 1/06 |
| 10,099,785 B1 * | 10/2018 | Gonzalez | ............. B64C 39/024 |
| 10,104,289 B2 * | 10/2018 | Enriquez | ........... H04N 5/23238 |

(Continued)

FOREIGN PATENT DOCUMENTS

EP 2942094 11/2015

*Primary Examiner* — Samir Abdosh
(74) *Attorney, Agent, or Firm* — Invent Capture, LLC.; Samuel S. Cho

(57) ABSTRACT

Various embodiments of a propeller-enclosed airlifting air tube apparatus are disclosed. The propeller-enclosed airlifting air tube apparatus contains a unique multi air-tube structure that functions as a plurality of air outtakes to produce stable lift force with one or more propellers enclosed in the apparatus. By encapsulating the propellers within the outer shells, the airlifting air tube apparatus is able to reduce potential bodily harm and property damage risks during a flight operation in a densely-populated environment or in another environment involving tight spaces. Preferably, the airlifting air tube apparatus encapsulates one or more pairs of contra-rotating propellers inside a drone casing to enhance operational safety while minimizing the overall footprint of the apparatus. Furthermore, the airlifting air tube apparatus incorporates a novel flight control steering unit configured to change directions and altitudes of the apparatus by dynamically adjusting airflow to each outtake air tube.

11 Claims, 9 Drawing Sheets

A Lateral View of an Airflow Control Ball-Based Steering Unit with Ball-Position Motors, Ball Control Rods, and/or Springs Encapsulated by an Outer Cover of a Novel Airlifting Air Tube Apparatus

(56) References Cited

U.S. PATENT DOCUMENTS

| | | | |
|---|---|---|---|
| 2006/0032972 A1* | 2/2006 | Vavra | B64C 27/20 |
| | | | 244/12.2 |
| 2006/0144994 A1* | 7/2006 | Spirov | B60V 1/06 |
| | | | 244/62 |
| 2008/0223993 A1* | 9/2008 | Spirov | B60V 1/06 |
| | | | 244/23 A |
| 2015/0321759 A1 | 11/2015 | Caubel | |
| 2018/0186450 A1* | 7/2018 | Chang | B64C 27/10 |
| 2018/0327070 A1* | 11/2018 | Rahnama | B64B 1/40 |

* cited by examiner

A Top Exterior View of an Embodiment of a Novel Airlifting Air Tube Apparatus

100

An Interior View of an Embodiment of a Novel Airlifting Air Tube Apparatus

An Example of Controlled Steering of a Novel Airlifting Air Tube Apparatus By Varying Outtake Airflows Among a Plurality of Air Tubes

300

A Lateral View of an Airflow Control Ball-Based Steering Unit in a Novel Airlifting Air Tube Apparatus

400

An Embodiment of an Airflow Control Ball-Based Steering Unit Controlled by Ball-Positioning Motors, Ball Control Rods, and/or Springs

500

A Lateral View of an Airflow Control Ball-Based Steering Unit with Ball-Position Motors, Ball Control Rods, and/or Springs Encapsulated by an Outer Cover of a Novel Airlifting Air Tube Apparatus

600

A Bottom-Up View of an Airflow Control Ball-Based Steering Unit with Ball-Position Motors, Ball Control Rods, and/or Springs near Air Tubes

700

A Bottom-Up View of an Airflow Control Ball-Based Steering Unit with Ball-Position Motors, Ball Control Rods, and/or Springs near Air Tubes Encapsulated by an Outer Cover of a Novel Airlifting Air Tube Apparatus

800

Examples of Ball-Position Motors Connected to Ball Control Rods and/or Springs for an Airflow Control Ball-Based Steering Unit in a Novel Airlifting Air Tube Apparatus

900

PROPELLER-ENCLOSED AIRLIFTING AIR TUBE APPARATUS

BACKGROUND OF THE INVENTION

The present invention generally relates to a flying apparatus. More specifically, the present invention relates to various embodiments of a novel propeller-enclosed and air tube-based airlifting apparatus.

As mobile multimedia communications methods and mechatronic control systems have become more sophisticated and cheaper in recent years, autonomous or remote-controlled flying apparatuses, also known as "drones," have experienced a significant market expansion from the specialty aeronautics and military application segment to the general consumer electronics segment. Drones that were out of reach for average consumer electronics purchase budgets many years ago are becoming dramatically inexpensive.

Empowered in part by today's increasingly-ubiquitous access to broadband wireless communication technology and real-time multimedia (e.g. video, audio, etc.) transmission capabilities, consumers are finding a myriad of potential uses for inexpensive drones available in the consumer electronics market. For example, today's consumers utilize drones for unmanned video recording, surveillance, advertising, and real-time multimedia broadcast.

As some of the drone applications involve indoor use or navigation through tight spaces, conventional drone designs with exposed propellers are substantial safety risks to humans, animals, and properties. High-velocity rotating propellers can harm, injure, or damage people, animals, and properties, if propeller blades accidentally come into contact with external objects. Despite these safety risks inherent in indoor or tight-spaces drone usage, conventional drone designs typically expose one or more propellers in open air, thus posing substantial danger to public safety as consumer applications of drone usage continue to grow exponentially in the future.

Therefore, it may be advantageous to provide a novel structure for a flying apparatus that reduces potential bodily harm and property damage risks during an operation of the flying apparatus in a densely-populated environment or in another environment involving tight spaces. Furthermore, it may also be advantageous to provide a novel flying apparatus that encapsulates one or more propellers inside a drone casing to enhance operational safety. Moreover, it may also be advantageous to provide a safety-enhancing and unique multi air-tube structure incorporated into the drone casing as air outtakes to produce stable lift force with the encapsulated propellers. In addition, it may also be advantageous to provide a novel flight control steering unit that controls direction and altitude of the novel flying apparatus.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, an airlifting air tube apparatus is disclosed. This airlifting air tube apparatus comprises: one or more propellers connected to one or more propeller motors, all of which are encapsulated by an exterior shell of the airlifting air tube apparatus, wherein the one or more propeller motors are configured to rotate the one or more propellers; a flight control circuitry configured to control rotational speeds and rotating orientations of the one or more propellers; an air intake path physically defined by an air intake opening on the exterior shell and an internal air passage leading to the one or more propellers encapsulated inside the airlifting air tube apparatus; and three or more outtake air tubes located on a bottom surface of the airlifting air tube apparatus, wherein the three or more outtake air tubes expel air drawn in and agitated by the one or more propellers and provide a sufficient lift force to enable the airlifting air tube apparatus to operate as a controlled flying device, and wherein adjusting a magnitude of expelled air in each of the three or more outtake air tubes triggers a change in direction or altitude during flight.

DETAILED DESCRIPTION

Figure 1:
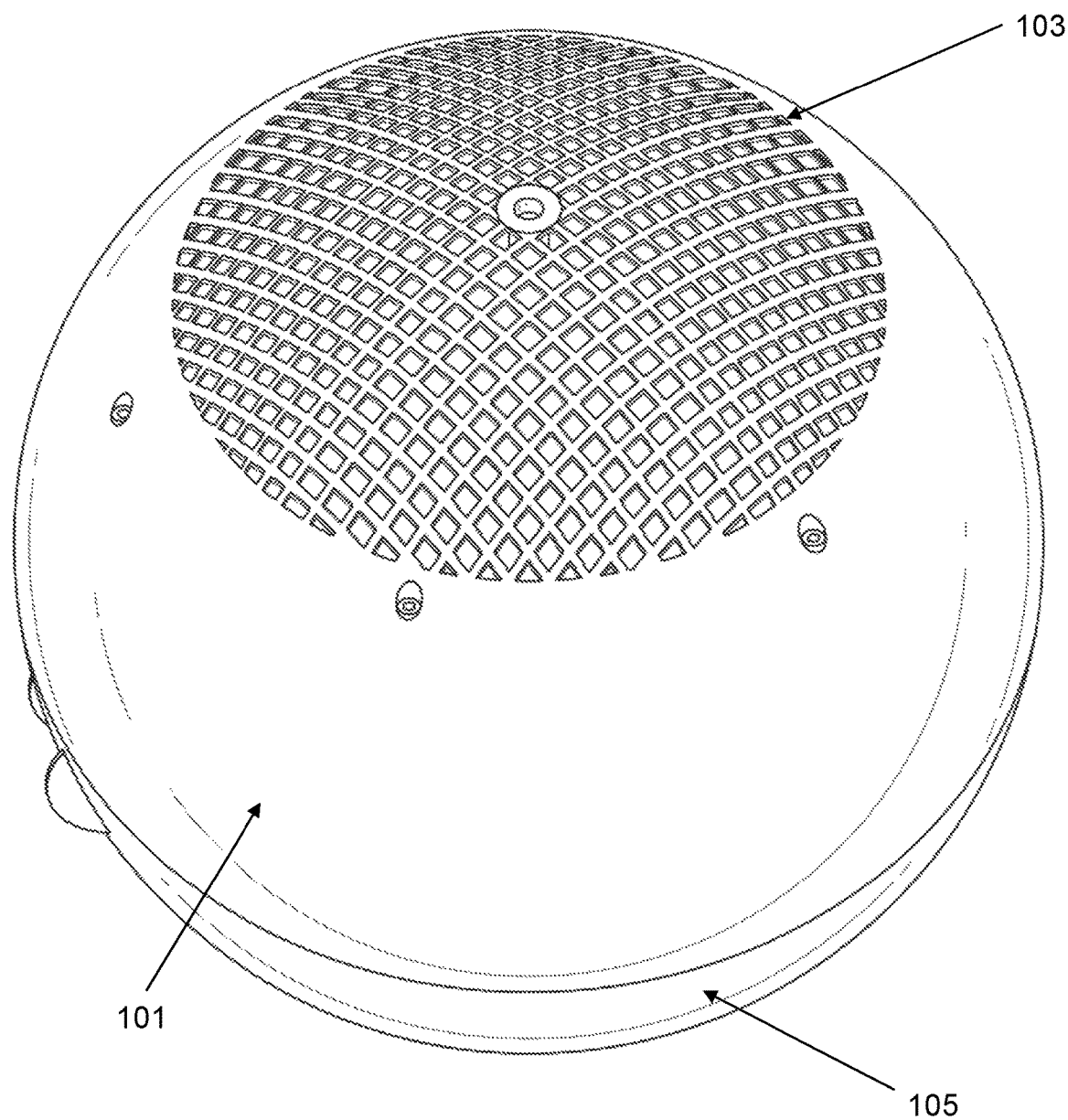
FIG. 1 shows a top exterior view of a novel airlifting air tube apparatus, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more airlifting air tube apparatuses that can be part of a flying apparatus or a drone, in accordance with another embodiment of the invention. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention does not inherently indicate any particular order and does not imply any limitations in the invention.

One objective of an embodiment of the present invention is to provide a propeller-enclosed flying apparatus with a novel air tube structure that reduces potential bodily harm and property damage risks during an operation of the novel flying apparatus in a densely-populated environment or in another environment involving tight spaces.

Another objective of an embodiment of the present invention is to provide a novel flying apparatus that encapsulates one or more propellers inside a drone casing to enhance operational safety.

A further objective of an embodiment of the present invention is to provide a safety-enhancing and unique multi air-tube structure incorporated into the drone casing as air outtakes to produce stable lift force with the encapsulated propellers.

In addition, another objective of an embodiment of the present invention is to provide a novel flight control steering unit that controls direction and altitude of the novel flying apparatus.

For the purpose of describing the invention, a term "drone" is defined as an unmanned flying apparatus, which may be remotely controlled by a user or operated autonomously based on artificial intelligence embedded in the device. A "flying apparatus," on the other hand, may be a manned aerial vehicle piloted by a human operator, or an unmanned aerial vehicle (i.e. a drone). Furthermore, an "airlifting air tube apparatus," which is described in various embodiments of the present invention, is a type of a novel flying apparatus that may be unmanned or manned.

Furthermore, for the purpose of describing the invention, a term "air tube" is defined as a pipe-like tubular structure configured to function as a forced air intake or a forced air outtake, wherein the forced air is typically provided by one or more rotating propellers exposed to the pipe-like tubular structure.

In addition, for the purpose of describing the invention, a term "airflow control steering unit" is defined as an electromechanical system configured to control and alter intake or outtake airflows among a plurality of air tubes in a flying apparatus to change directions and/or altitude of the flying apparatus. In a preferred embodiment of the invention, an airflow control steering unit comprises an airflow control ball suspended by a swingable rod, wherein the airflow control ball is precisely controlled by a plurality of ball control rods and/or springs, which can be dynamically adjusted (e.g. pulled, pushed, wound, or unwound) by a plurality of ball-positioning motors. When the airflow control ball is at its device-leveling or neutral position, the flying apparatus is able to hover in a stationary position, as the outtake airflows from a plurality of air tubes provide a weight distribution-compensating sustained lift force. The airflow control ball suspended in air by the swingable rod also creates a gravity pendulum-based self-stabilizing tendency to the airlifting air tube apparatus, whenever there is an external disturbance or turbulence that triggers instability to the current positioning of the apparatus. On the other hand, when the airflow control steering unit deliberately alters the position of the airflow control ball from its neutral position via one or more ball-positioning motors, ball control rods, and/or springs, the amount of outtake airflow in each air tube is no longer device-leveling, thus causing a directional and/or altitude change to the flying apparatus.

In another embodiment of the invention, another electromechanical or electromagnetic airflow control steering unit, other than the unit shown and described as the preferred embodiment (i.e. FIG. 5), may be utilized to provide a controlled airflow change to the plurality of air tubes for directional and/or altitude change in the flying apparatus. Furthermore, rotational speeds of propellers may be dynamically adjusted by a remote operator on a remote controller or by an autonomous flight control unit to change the altitude of the flying apparatus.

FIG. 1 shows a top exterior view (100) of a novel airlifting air tube apparatus, in accordance with an embodiment of the invention. In a preferred embodiment of the invention, the airlifting air tube apparatus is a drone comprising an upper exterior shell (101) that includes an air intake screen or opening (103), and a lower exterior shell (105) that provides a complete enclosure to one or more propellers inside the airlifting air tube apparatus for enhanced operational safety. In the preferred embodiment, the exterior shells (101, 105) are made of plastic, carbon fibers, or other synthetic materials that are lightweight yet rigid. In other embodiments, the exterior shells (101, 105) can be made of aluminum, titanium, lightweight alloys, or other metallic materials suitable for a flying apparatus.

As shown by the top exterior view (100) of FIG. 1, the airlifting air tube apparatus is preferably a spherically-shaped device that encapsulates propellers, air intake path(s), a flight control circuitry, an airflow control steering unit, a power management circuitry, a battery pack connected to a plurality of electronic components, and a plurality of outtake air tubes that provide controlled lift force to the airlifting air tube. In another embodiment of the invention, the airlifting air tube apparatus may have exterior shell components that constitute oval, rectangular, squarely, other geometrical shape(s) suitable for a safety-enhanced drone design.

Figure 2:
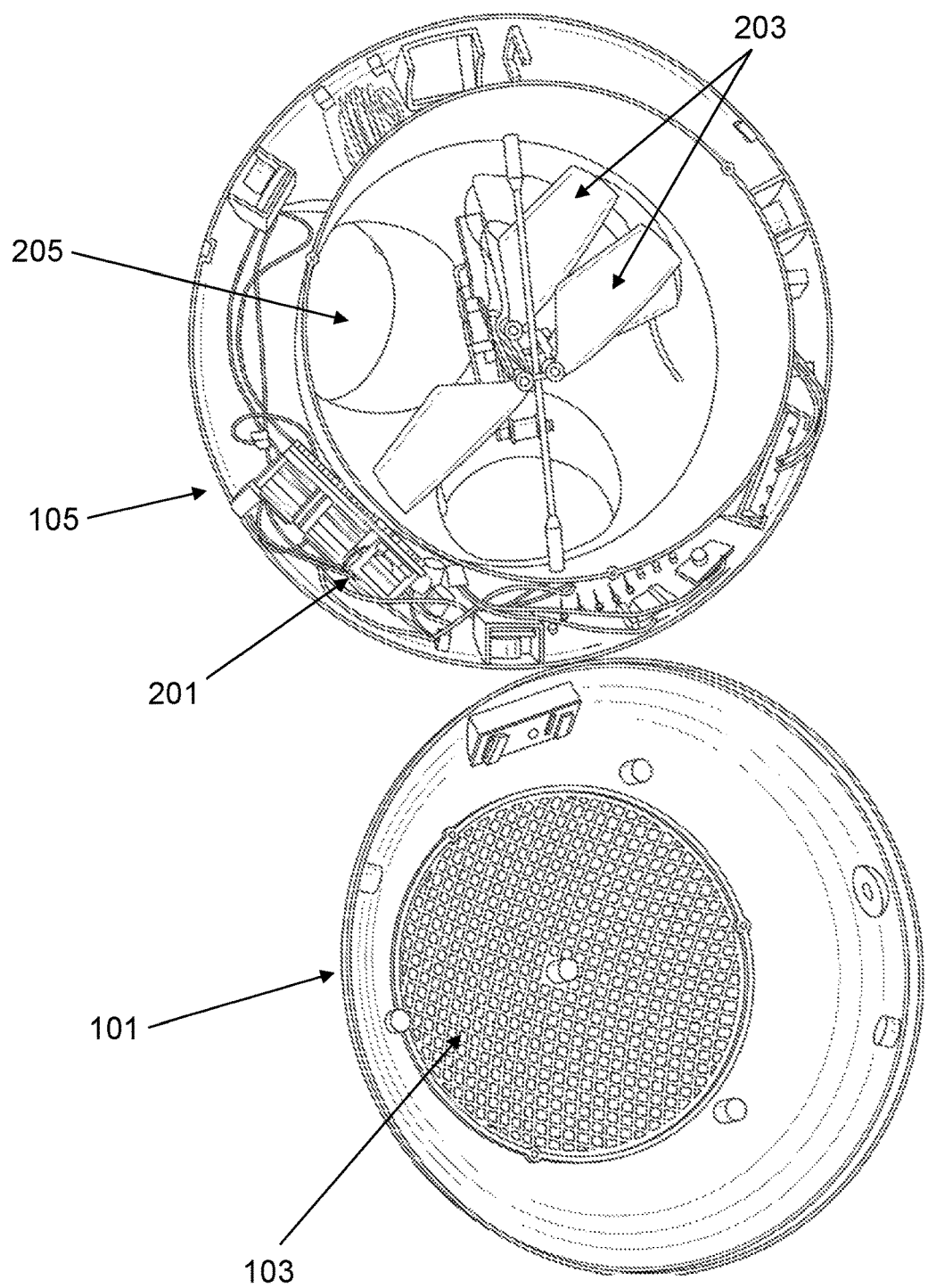
FIG. 2 shows an interior view of a novel airlifting air tube apparatus, in accordance with an embodiment of the invention.

FIG. 2 shows an interior view (200) of a novel airlifting air tube apparatus, in accordance with an embodiment of the invention. In a preferred embodiment of the invention, the interior of the airlifting air tube apparatus comprises a flight control circuitry (201) connected to a battery pack, a pair of contra-rotating propellers (203), and three outtake air tubes (205), as shown in FIG. 2. The flight control circuitry (201) is configured to control and adjust the flight behavior of the airlifting air tube apparatus by executing an embedded autonomous flight program (e.g. an autopilot program) or by receiving and processing remote flight commands from a remote control operator.

The flight control circuitry (201) typically includes a CPU, a memory unit, and a data storage to execute one or more flight control and navigational programs. Furthermore, in the preferred embodiment of the invention, various sensors, such as a gyroscope, a GPS receiver, a compass, an altimeter, and an accelerometer, may be connected to or incorporated into the flight control circuitry (201) to provide accurate flight and navigational controls. In some embodiments, a camera or a visual sensor may also be integrated into or connected to the flight control circuitry (201) to perform obstruction detection and recording of video footages.

Preferably, the flight control circuitry (201) also incorporates or is connected to a wireless data transceiver to receive and process the remote flight commands. Furthermore, the flight control circuitry (201) may incorporate or connect to an airflow control steering unit that controls and adjusts intake and/or outtake airflows to trigger a change in direction (i.e. leftward, rightward, upward, downward, etc.) of the airlifting air tube apparatus. In addition, the flight control circuitry (201) may also incorporate or connect to a power management unit that regulates the battery pack, the power supply to various electronic components in the apparatus, and the rechargeable capabilities of the battery pack, if the battery pack is rechargeable through an AC adapter or another means of an external electrical power supply.

As shown by the interior view (200) of the airlifting air tube apparatus, in the preferred embodiment of the invention, the pair of contra-rotating propellers (203) are configured to rotate in opposite orientations (i.e. contra-rotation) to cancel torque effects on the body of the apparatus, while drawing in air from the air intake screen or opening (103) and forcing the agitated air out through the three outtake air tubes (205). In other embodiments of the invention, the number of outtake air tubes (205) may be more than three, depending on desired levels of airborne stability for a drone. However, it is preferable to incorporate at least three outtake air tubes (205) in the airlifting air tube apparatus, as the steering control utilizing dynamic airflow adjustments to each outtake air tube may become less effective, if less than three outtake air tubes (205) are incorporated into the body of the airlifting air tube apparatus.

Continuing with FIG. 2, the interior view (200) of the airlifting air tube apparatus also shows the lower exterior shell (105), which at least partially contains the flight control circuitry (201), the power management unit, the battery pack, and the pair of contra-rotating propellers (203). In many embodiments of the invention, a rigid cubby space formed between the outer layer of the lower exterior shell (105) and the air intake path (i.e. 313 of FIG. 3) may serve as a desirable location to place electronic and battery components, because it is at least somewhat isolated from the air intake or outtake pathways (e.g. 313 of FIG. 3, 205). Moreover, as shown in FIG. 2, the air intake screen or opening (103) is part of the upper exterior shell (101). In some embodiments of the invention, the diameter of the air intake screen or opening (103), if circular, may be equal to the diameter of the air intake path (i.e. 313 of FIG. 3) to provide an airtight seal when the upper exterior shell (101) and the lower exterior shell (105) are held together. The airtight fitting may improve the efficiency of the forced airflow provided by the pair of contra-rotating propellers (203). Yet in other embodiments of the invention, the airtight fitting may be unnecessary for operating the airlifting air tube apparatus.

Figure 3:
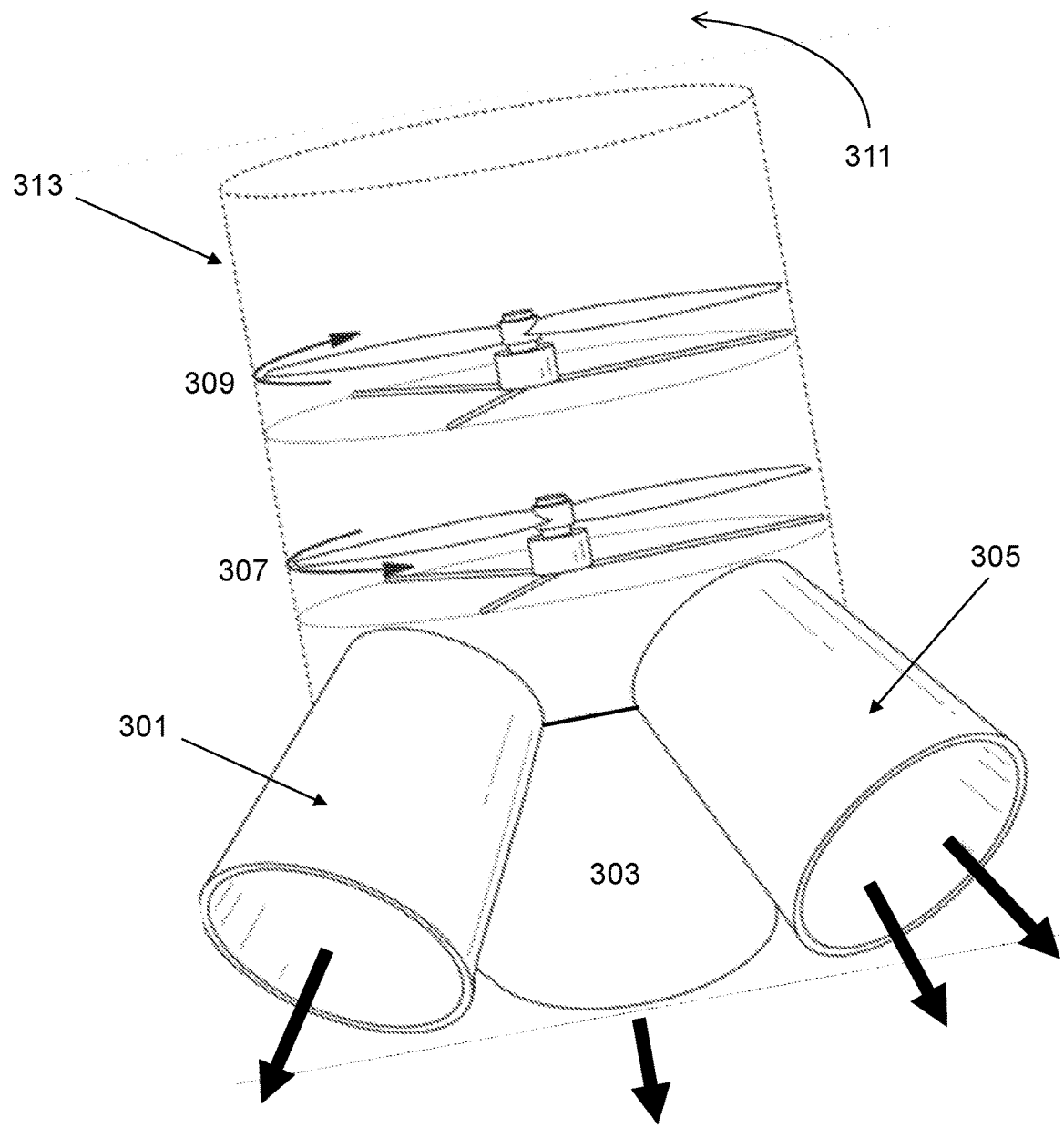
FIG. 3 shows an example of controlled steering of a novel airlifting air tube apparatus by varying outtake airflows among a plurality of air tubes, in accordance with an embodiment of the invention.

FIG. 3 shows an example (300) of controlled steering of a novel airlifting air tube apparatus by varying outtake airflows among a plurality of air tubes, in accordance with an embodiment of the invention. In this example (300), the airlifting air tube apparatus achieves directional and altitude changes (i.e. leftward, rightward, angled tilts, forward, backward, hovering, etc.) by adjusting outtake airflows on a first outtake air tube (301), a second outtake air tube (303), and a third outtake air tube (305). Preferably, there are at least three outtake air tubes (i.e. 301, 303, 305) in the airlifting air tube apparatus to provide lift force by forcing air out of each outtake air tube and by varying the amount of air outtake with an airflow control steering component, which is further elaborated in FIGS. 4-9.

In the preferred embodiment of the invention, an outtake air tube is a pipe-like tubular structure configured to function as a forced air outtake, wherein the forced air is typically provided by a pair of contra-rotating propellers (307, 309) that draw in outside air via an air intake path (313). In one embodiment, each propeller (307 or 309) is connected to a propeller motor configured to rotate each propeller independently from each other at a desirable speed controlled and determined by the flight control circuitry (201). In another embodiment, the pair of contra-rotating propellers is connected to a single electrical motor that rotates both of the contra-rotating propellers. Typically, the propellers are electrically powered by rechargeable batteries.

In the example (300) as shown in FIG. 3, the airlifting air tube apparatus steers counterclockwise and leftward (311), as more air is expelled (i.e. per second, or per same amount of time) from the third outtake air tube (305), while the first outtake air tube (301) and the second outtake air tube (303) expel less amount of air compared to the third outtake air tube (305).

In another example, if the first outtake air tube (301) expels more air (i.e. per second, or per same amount of time) than the second outtake air tube (303) and the third outtake air tube (305), then the airlifting air tube apparatus will steer clockwise or rightward. Yet in another example, if the first outtake air tube (301) and the third outtake air tube (305) expel more air (i.e. per second, or per same amount of time) than the second outtake air tube (303), then the airlifting air tube apparatus will tilt rearward and/or move rearward.

Moreover, in another example, if the second outtake air tube (303) expels more air (i.e. per second, or per same amount of time) than the first outtake air tube (301) and the third outtake air tube (305), then the airlifting air tube apparatus will tilt forward and/or move forward. Furthermore, in another example, if all of the outtake air tubes (301, 303, 305) expel equal or weight distribution-compensated amount of air per second or per same amount of time, the airlifting air tube apparatus will hover in a stationary position, or change its altitude vertically based on the current rotational speeds of the pair of contra-rotating propellers (307, 309).

Continuing with FIG. 3, the air intake path (313) is typically surrounded by a rigid wall to provide a sealed air intake pathway to the pair of contra-rotating propellers (307, 309). Furthermore, the blade angle of the first propeller (307) and the blade angle of the second propeller (309) may be inversely tilted from each other to provide a consistent upward lift force (i.e. a directionally unified forced air movement), even as each propeller rotates in opposite orientation to counteract the torque effect caused by propeller rotations.

Moreover, in an alternate embodiment of the invention, one or more propellers may be located inside each of the three or more outtake air tubes, instead of being placed in the general air intake path (313), to provide a direct airflow control to each outtake air tube by controlling the speed and the orientation of each of the outtake air tube-embedded propellers. In such alternate embodiments of the invention, an airflow control ball-based steering unit, as described in detail in association with FIGS. 4-9, may not be necessary because a direct steering control is achieved by the outtake air tube-embedded propellers.

Figure 4:
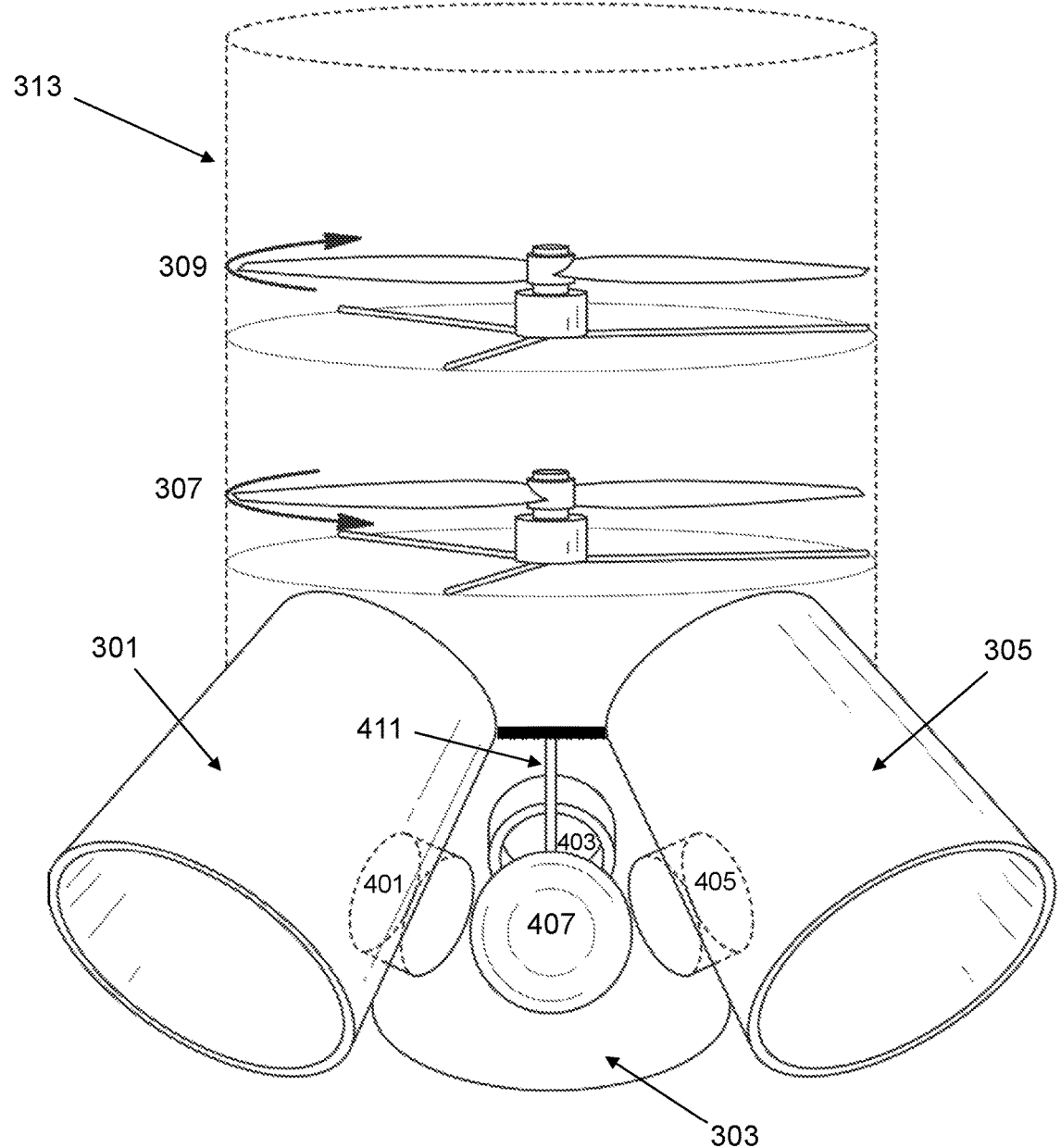
FIG. 4 shows an airflow control ball-based steering unit in a novel airlifting air tube apparatus, in accordance with an embodiment of the invention.

FIG. 4 shows an airflow control ball-based steering unit (400) in a novel airlifting air tube apparatus, in accordance with an embodiment of the invention. An airflow control steering unit is generally described herein as an electromechanical system configured to control and alter intake or outtake airflows among a plurality of air tubes in a flying apparatus to change directions and/or altitude of the flying apparatus. In this particular embodiment as shown in FIG. 4, the airflow control ball-based steering unit (400) is one type of the airflow control steering unit.

The airflow control ball-based steering unit (400) comprises an airflow control ball (407) suspended by a swingable rod (411), wherein the airflow control ball (407) is in a natural gravity pendulum state or precisely controlled by a plurality of ball control rods and/or springs that are dynamically adjusted (e.g. pulled, pushed, wound, or unwound) by a plurality of ball-positioning motors to partially close or fully close one of the three airflow adjusters (401, 403, 405). Alternatively, the position of the airflow control ball (407) may be adjusted by electromagnetic forces or other mechanisms that cause a controlled movement of the airflow control ball (407). In the preferred embodiment of the invention, the airflow control ball suspended in air by the swingable rod also creates a gravity pendulum-based self-stabilizing tendency to the airlifting air tube apparatus, whenever there is an external disturbance or turbulence that triggers instability to the current positioning of the apparatus.

In the preferred embodiment, a first airflow adjuster (401) is a hole on a sidewall of the first outtake air tube (301). Likewise, a second airflow adjuster (403) is a hole on a sidewall of the second outtake air tube (303), and a third airflow adjuster (405) is a hole on a sidewall of the third outtake air tube (305). In another embodiment of the invention, the number of airflow adjusters and the number of outtake air tubes may be greater than three, especially if a finer directional control is desired for the airlifting air tube apparatus.

In the preferred embodiment of the invention, the airflow control ball (407) is at its "device-leveling" or "neutral" position, if the airflow control ball (407) is equidistant from each outtake air tube, as shown in FIG. 4, and if the airlifting air tube apparatus exhibits a balanced and even weight distribution relative to locations of the outtake air tubes. On the other hand, if the airlifting air tube apparatus instead exhibits an uneven weight distribution relative to the specific locations of the outtake air tubes, then the airflow control ball (407) can be configured to achieve its "neutral" position via a gravity pendulum movement to self-stabilize the airlifting air tube apparatus, and if necessary, by artificially differentiating the airflow out of each outtake air tube by repositioning the airflow control ball (407). For example, an outtake air tube located closer to the heavier side of the airlifting air tube apparatus can expel higher-pressure air than outtake air tube(s) located farther way from the heavier side, which enables leveling and stabilization of the airlifting air tube apparatus. The repositioning of the airflow control ball (407) can be achieved by artificially pulling or pushing the airflow control ball (407) with ball-position rods and/or springs that are controlled by ball-positioning motors.

When the airflow control ball (407) is at its neutral position, the airlifting air tube apparatus is able to hover in a stationary position. The airflow control ball suspended in air by the swingable rod also creates a gravity pendulum-based self-stabilizing tendency to the airlifting air tube apparatus, whenever there is an external disturbance or turbulence that triggers instability to the current positioning of the apparatus. On the other hand, when the airflow control ball-based steering unit deliberately alters the "neutral" position of the airflow control ball via one or more ball-positioning motors, ball control rods, and/or springs, the amount of outtake airflow in each outtake air tube is no longer at its device-leveling state, thus causing a directional and/or altitude change to the airlifting air tube apparatus.

For example, if the airflow control ball (407) is moved closer to the first airflow adjuster (401) on the first outtake air tube (301), more air will flow through the first outtake air tube (301) relative to the second outtake air tube (303) and the third outtake air tube (305), thus resulting in a clockwise tilt and/or a rightward directional change to the airlifting air tube apparatus. Similarly, if the airflow control ball (407) is moved closer to the second airflow adjuster (403) on the second outtake air tube (303), more air will flow through the second outtake air tube (303) relative to the first outtake air tube (301) and the third outtake air tube (305), thus resulting in a forward tilt and/or a forward directional change (i.e. out of the page from FIG. 4) to the airlifting air tube apparatus. Likewise, if the airflow control ball (407) is moved closer to the third airflow adjuster (405) on the third outtake air tube (305), more air will flow through the third outtake air tube (305) relative to the first outtake air tube (301) and the second outtake air tube (303), thus resulting in a counter-clockwise tilt and/or a leftward directional change to the airlifting air tube apparatus. Furthermore, other directional changes or altitude changes are possible by adjusting the current position of the airflow control ball (407) to a specific position that alters the amount of outtake airflow on each outtake air tube.

Figure 5:
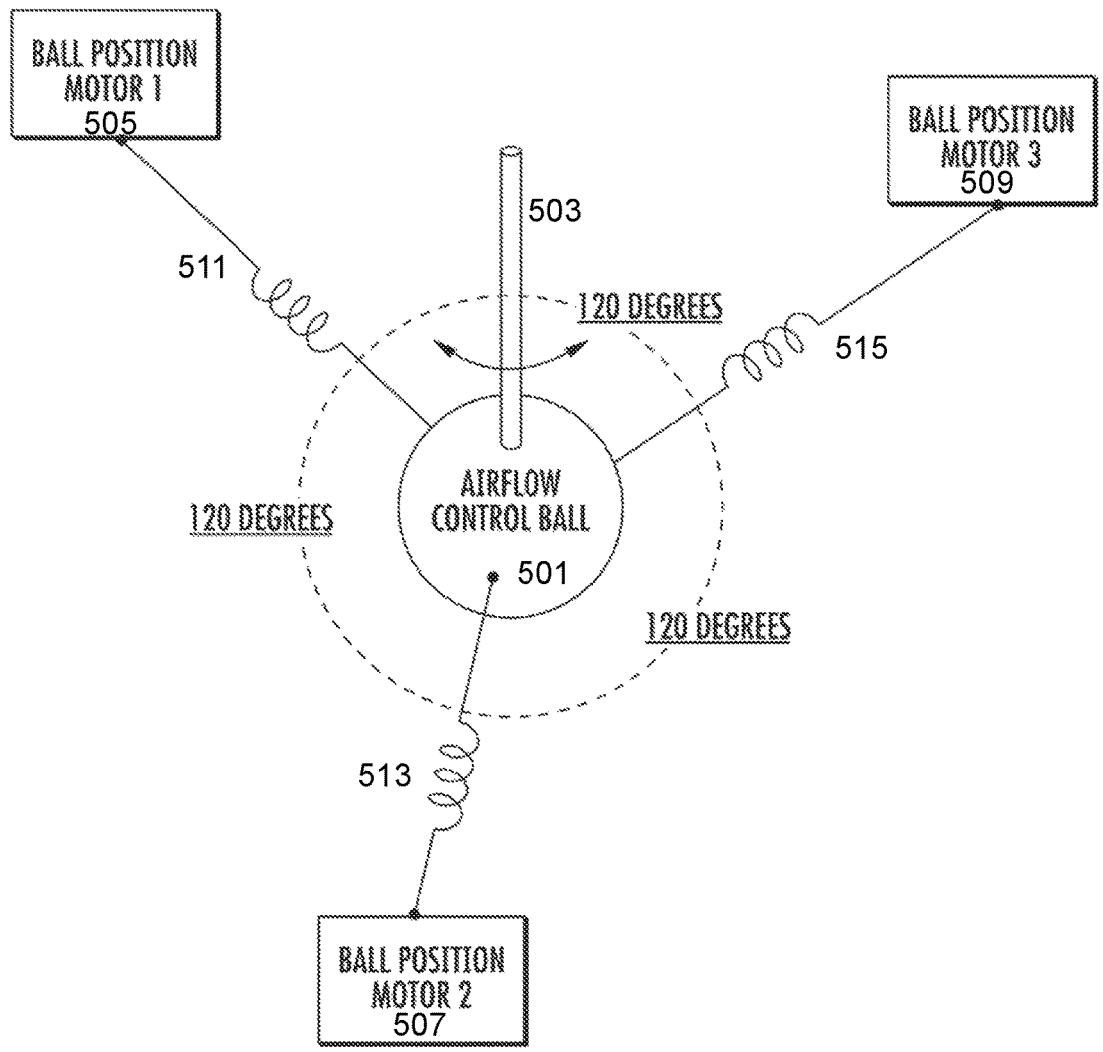
FIG. 5 shows an airflow control ball-based steering unit controlled by ball-positioning motors, ball control rods, and/or springs, in accordance with an embodiment of the invention.

FIG. 5 shows an airflow control ball-based steering unit (500), which is controlled by ball-positioning motors (505, 507, 509), ball control rods, and/or springs (511, 513, 515), in accordance with an embodiment of the invention. The airflow control ball-based steering unit (500) includes an airflow control ball (501) suspended by a swingable rod (503), which is attached to a rigid structure near outtake air tubes. The swingable rod (503) may be made of metals, rubber, or synthetic materials. Similarly, the airflow control ball (501) may be made of metals, rubber, or synthetic materials, and is capable of reducing or blocking the airflow from one or more holes (i.e. airflow adjusters) located on a sidewall of each outtake air tube.

As shown in FIG. 5, in a preferred embodiment of the invention, the airflow control ball (501) is configured to be pulled or pushed by ball control rods and/or springs (511, 513, 515) that can be moved, wound, or unwound by three corresponding ball-positioning motors (505, 507, 509). In this example, each ball control rod and/or spring is approximately 120 degrees separated from an adjacent ball control rod and/or spring. In another embodiment of the invention, the degree of separation between each ball control rod and/or spring may be reduced if more than three ball-positioning motors and more than three sets of ball control rods and/or springs are utilized. Reducing such degrees of separation between each ball control rod and/or spring may enable finer angular adjustments of the airflow control ball (501), which in turn produces more precise flight control characteristics for the airlifting air tube apparatus.

In the example as shown in FIG. 5, the airflow control ball (501) may be moved, pulled, or pushed by a plurality of ball control rods and/or springs simultaneously, which causes the relocation of the airflow control ball (501) to an angular position between two or more airflow adjusters (i.e. multiple holes on a multiple number of outtake air tubes), instead of merely moving towards or away from one particular airflow adjuster (i.e. one particular hole on one particular outtake air tube). Such in-between angular position adjustment capabilities provide finer directional and altitude controls to the airlifting air tube apparatus that incorporates the airflow control ball-based steering unit In another embodiment of the invention, another electro-mechanical or electromagnetic airflow control steering unit, other than the unit shown and described as the preferred embodiment in FIG. 5, may be utilized to provide a controlled airflow change to the plurality of air tubes for directional and/or altitude changes in the airlifting air tube apparatus. Furthermore, rotational speeds of propellers may be dynamically adjusted by a remote operator on a remote controller or by an autonomous flight control unit to change the altitude of the airlifting air tube apparatus.

Figure 6:
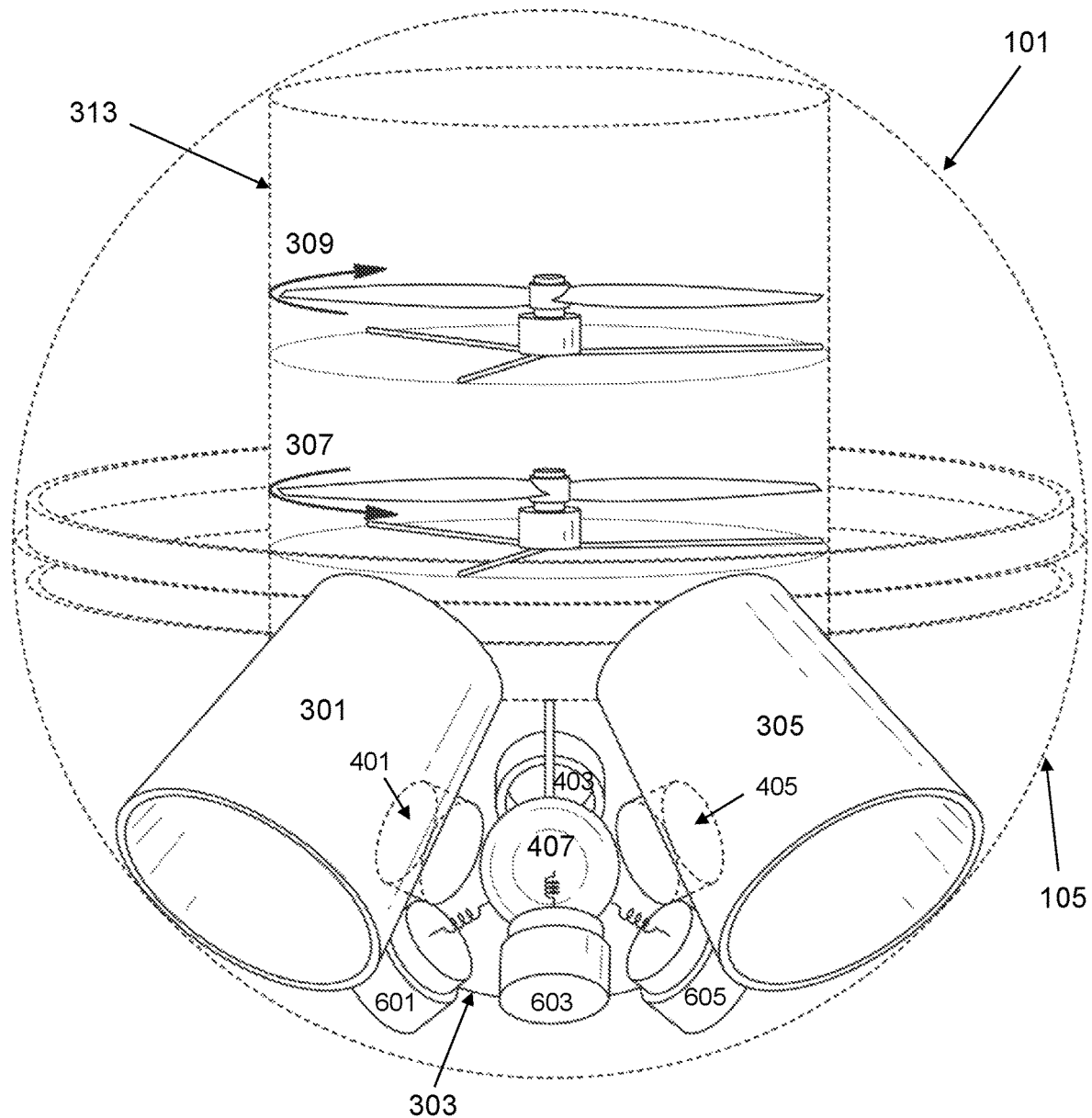
FIG. 6 shows a lateral view of an airflow control ball-based steering unit with ball-positioning motors, ball control rods, and/or springs encapsulated by an outer cover of a novel airlifting air tube apparatus, in accordance with an embodiment of the invention.

FIG. 6 shows a lateral view (600) of an airflow control ball-based steering unit with ball-positioning motors (601, 603, 605), ball control rods, and/or springs encapsulated by the upper exterior shell (101) and the lower exterior shell (105) of a novel airlifting air tube apparatus, in accordance with an embodiment of the invention. The airflow control ball-based steering unit comprises an airflow control ball (407) suspended by a swingable rod attached to a rigid structure near outtake air tubes, wherein the airflow control ball (407) is precisely controlled by a plurality of ball control rods and/or springs, which can be dynamically adjusted (e.g. pulled, pushed, wound, or unwound) by the ball-positioning motors (601, 603, 605) to partially close or fully close one of the three airflow adjusters (401, 403, 405). Alternatively, the position of the airflow control ball (407) may be adjusted by electromagnetic forces or other mechanisms that cause a controlled movement of the airflow control ball (407).

In the preferred embodiment, the first airflow adjuster (401) is a hole on a sidewall of the first outtake air tube (301). Likewise, the second airflow adjuster (403) is a hole on a sidewall of the second outtake air tube (303), and the third airflow adjuster (405) is a hole on a sidewall of the third outtake air tube (305). In another embodiment of the invention, the number of airflow adjusters and the number of outtake air tubes may be greater than three, especially if a finer directional control is desired for the airlifting air tube apparatus.

In the preferred embodiment of the invention, the airflow control ball (407) is at its "device-leveling" or "neutral" position, if the airflow control ball (407) is equidistant from each outtake air tube, as shown in FIG. 6, and if the airlifting air tube apparatus exhibits a balanced and even weight distribution relative to locations of the outtake air tubes. On the other hand, if the airlifting air tube apparatus instead exhibits an uneven weight distribution relative to the specific locations of the outtake air tubes, then the airflow control ball (407) can be configured to achieve its device-leveling "neutral" position via a gravity pendulum movement to self-stabilize the airlifting air tube apparatus, and if necessary, by artificially differentiating the airflow out of each outtake air tube by repositioning the airflow control ball (407). For example, an outtake air tube located closer to the heavier side of the airlifting air tube apparatus can expel higher-pressure air than outtake air tube(s) located farther way from the heavier side, which enables leveling and stabilization of the airlifting air tube apparatus. The repositioning of the airflow control ball (407) can be achieved by artificially pulling or pushing the airflow control ball (407) with ball-position rods and/or springs that are controlled by ball-positioning motors.

When the airflow control ball (407) is at its neutral position, the airlifting air tube apparatus is able to hover in a stationary position. On the other hand, when the airflow control ball-based steering unit deliberately alters the position of the airflow control ball via one or more ball-positioning motors, ball control rods, and/or springs, the amount of outtake airflow in each outtake air tube is no longer at its device-leveling or neutral position, thus causing a directional and/or altitude change to the airlifting air tube apparatus.

For example, if the airflow control ball (407) is moved closer to the first airflow adjuster (401) on the first outtake air tube (301) by rod(s) and/or spring(s) connected to ball-positioning motor(s), more air will flow through the first outtake air tube (301) relative to the second outtake air tube (303) and the third outtake air tube (305), thus resulting in a clockwise tilt and/or a rightward directional change to the airlifting air tube apparatus. Similarly, if the airflow control ball (407) is moved closer to the second airflow adjuster (403) on the second outtake air tube (303) by rod(s) and/or spring(s) connected to ball-positioning motor(s), more air will flow through the second outtake air tube (303) relative to the first outtake air tube (301) and the third outtake air tube (305), thus resulting in a forward tilt and/or a forward directional change (i.e. out of the page on FIG. 6) to the airlifting air tube apparatus. Likewise, if the airflow control ball (407) is moved closer to the third airflow adjuster (405) on the third outtake air tube (305), more air will flow through the third outtake air tube (305) relative to the first outtake air tube (301) and the second outtake air tube (303), thus resulting in a counterclockwise tilt and/or a leftward directional change to the airlifting air tube apparatus. Furthermore, other directional changes or altitude changes are possible by adjusting the current position of the airflow control ball (407) to a specific position that alters the amount of outtake airflow on each outtake air tube.

Figure 7:
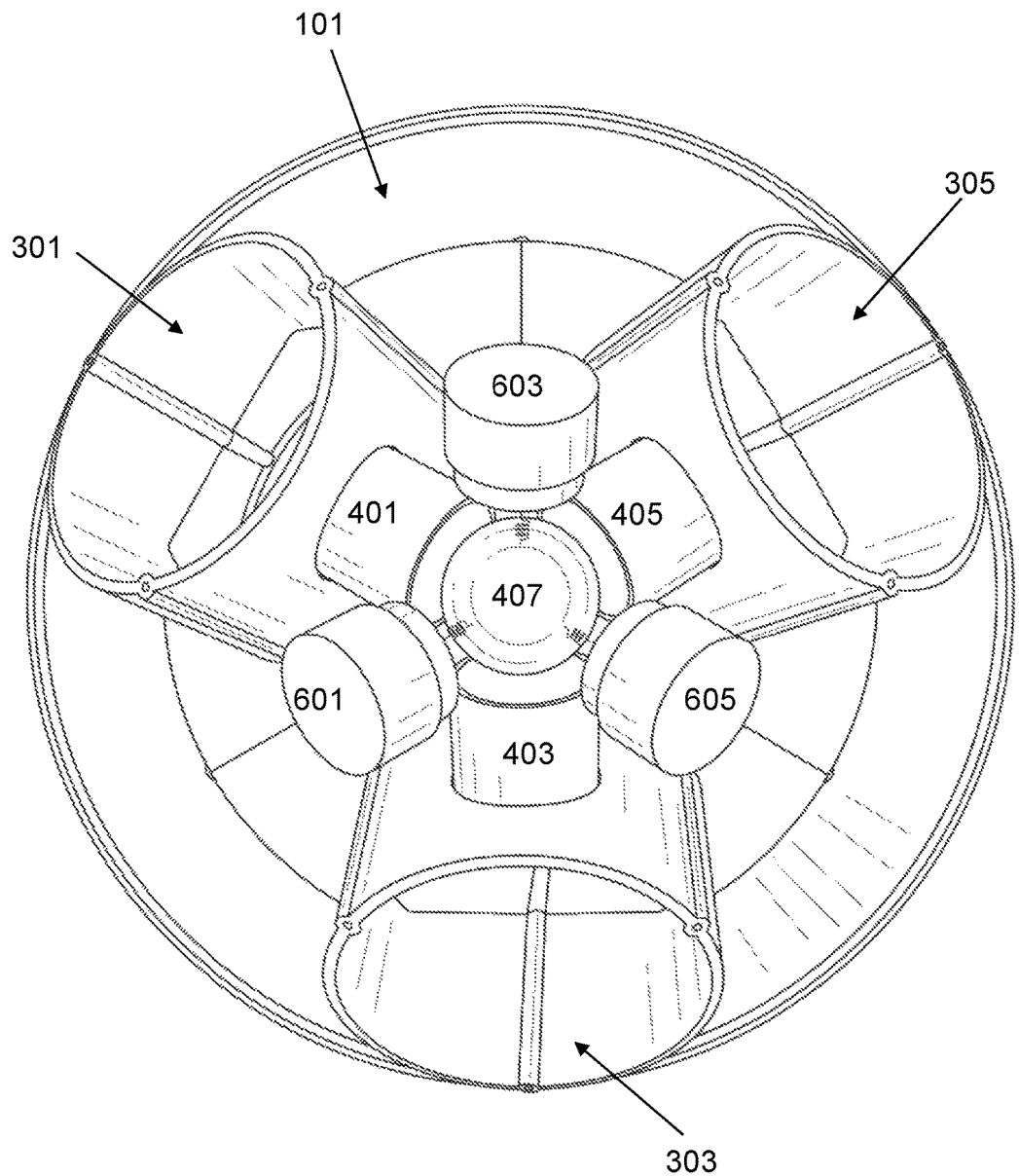
FIG. 7 shows a bottom-up view of an airflow control ball-based steering unit with ball-positioning motors, ball control rods, and/or springs near air tubes, in accordance with an embodiment of the invention.

FIG. 7 shows a bottom-up view (700) of an airflow control ball-based steering unit with ball-positioning motors (601, 603, 605), ball control rods, and/or springs near outtake air tubes (301, 303, 305), which are partially enclosed by the upper exterior shell (101) while the lower exterior shell (105) is removed from the apparatus from the bottom-up view (700) for demonstrative visual clarity, in accordance with an embodiment of the invention.

The airflow control ball-based steering unit comprises an airflow control ball (407) suspended by a swingable rod attached to a rigid structure near outtake air tubes (301, 303, 305), wherein the airflow control ball (407) is precisely controlled by a plurality of ball control rods and/or springs, which can be dynamically adjusted (e.g. pulled, pushed, wound, or unwound) by the ball-positioning motors (601, 603, 605) to partially close or fully close one of the three airflow adjusters (401, 403, 405). Alternatively, the position of the airflow control ball (407) may be adjusted by electromagnetic forces or other mechanisms that cause a controlled movement of the airflow control ball (407).

In this embodiment, the first airflow adjuster (401) is a tubular hole on a sidewall of the first outtake air tube (301). Likewise, the second airflow adjuster (403) is a tubular hole on a sidewall of the second outtake air tube (303), and the third airflow adjuster (405) is also a tubular hole on a sidewall of the third outtake air tube (305). In another embodiment of the invention, the number of airflow adjusters and the number of outtake air tubes may be greater than three, especially if a finer directional control is desired for the airlifting air tube apparatus.

In the embodiment of the invention as shown in FIG. 7, the airflow control ball (407) is at its "device-leveling" or "neutral" position, if the airflow control ball (407) is equidistant from each outtake air tube, and if the airlifting air tube apparatus exhibits a balanced and even weight distribution relative to locations of the outtake air tubes. On the other hand, if the airlifting air tube apparatus instead exhibits an uneven weight distribution relative to the specific locations of the outtake air tubes, then the airflow control ball (407) can be configured to achieve its device-leveling "neutral" position via a gravity pendulum movement to self-stabilize the airlifting air tube apparatus, and if necessary, by artificially differentiating the airflow out of each outtake air tube by repositioning the airflow control ball (407).

When the airflow control ball (407) is at its neutral position, the airlifting air tube apparatus that exhibits the balanced and even weight distribution relative to the locations of the outtake air tubes is able to hover in a stationary position, as equal amounts of outtake airflow are provided to each outtake air tube among a plurality of outtake air tubes. When the airflow control ball-based steering unit deliberately alters the position of the airflow control ball from its neutral position via one or more ball-positioning motors (601, 603, 605), ball control rods, and/or springs, the amount of outtake airflow in each outtake air tube is no longer device-leveling, thus causing a directional and/or altitude change to the airlifting air tube apparatus.

Figure 8:
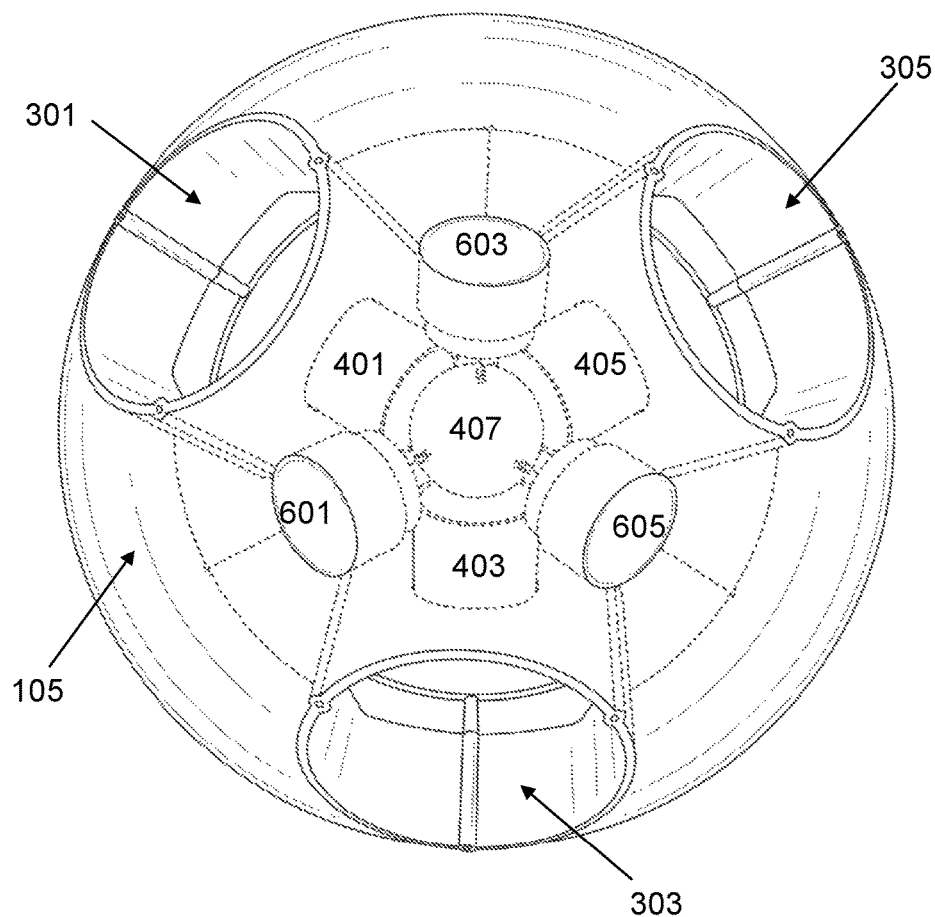
FIG. 8 shows a bottom-up view of an airflow control ball-based steering unit with ball-positioning motors, ball control rods, and/or springs near air tubes encapsulated by an outer cover of a novel airlifting air tube apparatus, in accordance with an embodiment of the invention.

FIG. 8 shows a bottom-up view (800) of an airflow control ball-based steering unit with ball-positioning motors (601, 603, 605), ball control rods, and/or springs near outtake air tubes (301, 303, 305) that are encapsulated by the lower exterior shell (105) of a novel airlifting air tube apparatus, in accordance with an embodiment of the invention. In this embodiment of the invention, when the lower exterior shell (105) covers the bottom portion of the airlifting air tube apparatus, the airflow control ball-based steering unit is entirely enclosed within the spherical shell of the apparatus, and only the three outtake air tubes (301, 303, 305) are openly exposed to expel air agitated by enclosed propellers.

Figure 9:
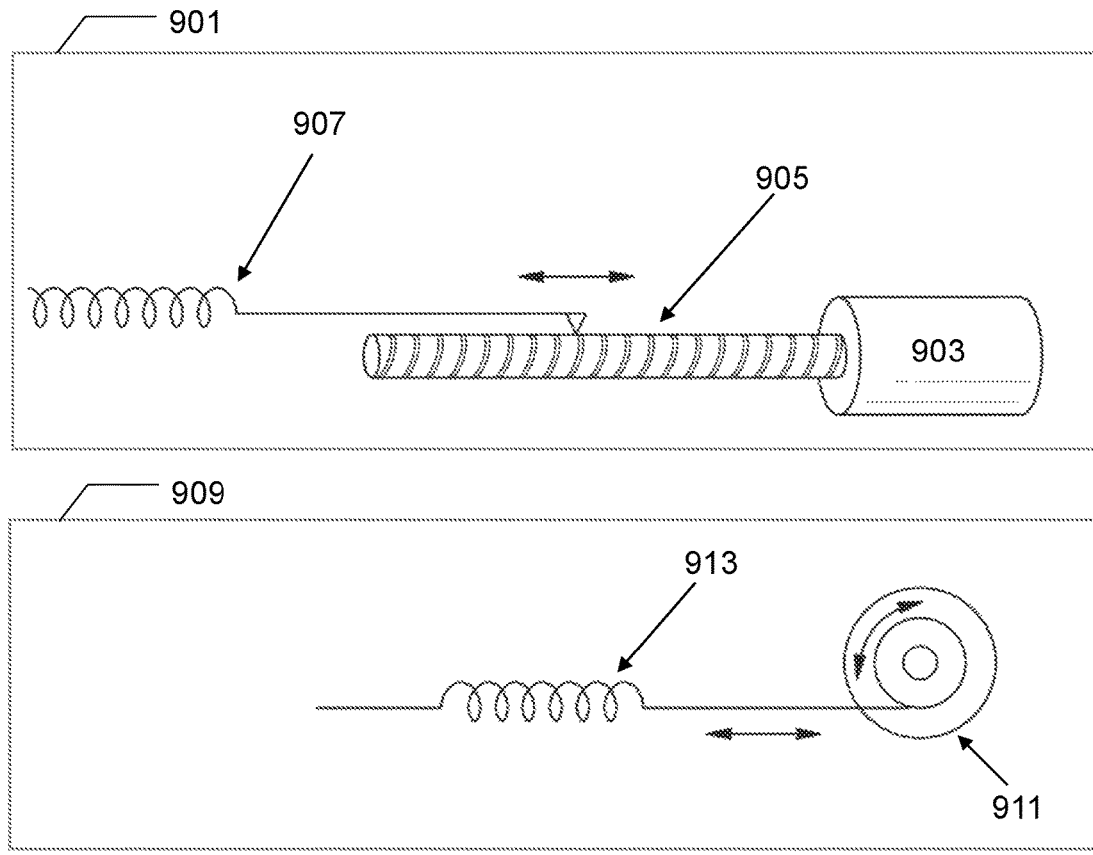
FIG. 9 shows examples of ball-positioning motors connected to ball control rods and/or springs for an airflow control ball-based steering unit in a novel airlifting air tube apparatus, in accordance with an embodiment of the invention.

FIG. 9 shows two examples (901, 909) of ball-positioning motor shafts (903, 911) connected to ball control rods and/or springs (905, 907, 913) for an airflow control ball-based steering unit in a novel airlifting air tube apparatus, in accordance with an embodiment of the invention.

In the first example (901), a longitudinal ball-positioning motor shaft (903) is configured to wind or unwind a portion (905) of a ball control spring (907) to change the length of the ball control spring (907). Winding of the ball control spring (907) shortens the length of the ball control spring attached to the airflow control ball, which has an effect of "pulling" the airflow control ball towards the longitudinal ball-positioning motor shaft (903). Unwinding the ball control spring (907), on the other hand, lengthens the length of the ball control spring attached to the airflow control ball, which has an effect of "pushing" the airflow control ball away from the longitudinal ball-positioning motor shaft (903).

Similarly, in the second example (909), a transversely-oriented ball-positioning motor shaft (911) is configured to wind or unwind a portion of a second ball control spring (913) to change the length of the ball control spring (913). Winding of the ball control spring (913) shortens the length of the ball control spring attached to the airflow control ball, which has an effect of "pulling" the airflow control ball towards the transversely-oriented ball-positioning motor shaft (911). Unwinding the ball control spring (913), on the other hand, lengthens the length of the ball control spring attached to the airflow control ball, which has an effect of "pushing" the airflow control ball away from the transversely-oriented ball-positioning motor shaft (911).

Various embodiments of the present invention, as described above, provide several advantages over conventional flying apparatus and drone designs. For example, the airlifting air tube apparatus in accordance with an embodiment of the present invention provides a propeller-enclosed flying apparatus with a novel air tube structure that reduces potential bodily harm and property damage risks during an operation of the novel flying apparatus in a densely-populated environment or in another environment involving tight spaces.

Another advantage of an embodiment of the present invention is a complete encapsulation and containment of one or more contra-rotating propellers inside a drone casing to enhance operational safety while minimizing the overall footprint of the flying apparatus.

Furthermore, another advantage of an embodiment of the present invention is providing a safety-enhancing and unique multi air-tube structure incorporated into a drone casing as a plurality of air outtakes to produce stable lift force.

Moreover, another advantage of an embodiment of the present invention is providing a novel flight control steering unit that controls direction and altitude of the novel flying apparatus.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An airlifting air tube apparatus comprising:
   one or more propellers connected to one or more propeller motors, all of which are encapsulated by an exterior shell of the airlifting air tube apparatus, wherein the one or more propeller motors are configured to rotate the one or more propellers;
   a flight control circuitry configured to control rotational speeds and rotating orientations of the one or more propellers;
   an air intake path physically defined by an air intake opening on the exterior shell and an internal air passage leading to the one or more propellers encapsulated inside the airlifting air tube apparatus;
   three or more outtake air tubes located on a bottom surface of the airlifting air tube apparatus, wherein the three or more outtake air tubes expel air drawn in and agitated by the one or more propellers and provide a sufficient lift force to enable the airlifting air tube apparatus to operate as a controlled flying device, and wherein adjusting a magnitude of expelled air in each of the three or more outtake air tubes triggers a change in direction or altitude during flight; and
   an airflow control steering unit and one or more airflow adjusters, wherein the airflow control steering unit is configured to reduce or increase the magnitude of expelled air in each of the three or more outtake air tubes by opening or closing the one or more airflow adjusters.

2. The airlifting air tube apparatus of claim 1, wherein the airflow control steering unit further comprises an airflow control ball suspended in air by a swingable rod, wherein the suspension of the airflow control ball provides a gravity pendulum-based self-stabilizing tendency to the airlifting air tube apparatus against external disturbances or turbulence.

3. The airlifting air tube apparatus of claim 2, wherein the airflow control steering unit further comprises the swingable rod attached to the airflow control ball, one or more ball-positioning motors, and at least one of ball control rods and springs connected to the airflow control ball and the one or more ball-positioning motors, wherein a current position of the airflow control ball is adjusted by winding or unwinding of the ball control rods and the springs via a motor shaft rotation of the one or more ball-positioning motors.

4. The airlifting air tube apparatus of claim 1, wherein the airflow control steering unit incorporates an electromechanical element or a motorized lid to open or close the one or more airflow adjusters.

5. The airlifting air tube apparatus of claim 1, further comprising a battery pack connected to the flight control circuitry and the one or more propeller motors to provide electrical power to electronic components contained in the airlifting air tube apparatus.

6. The airlifting air tube apparatus of claim 1, further comprising a power management unit connected to or incorporated into the flight control circuitry.

7. The airlifting air tube apparatus of claim 1, wherein the exterior shell is made of plastic, metallic alloys, carbon fibers, or another lightweight material.

8. The airlifting air tube apparatus of claim 1, wherein the exterior shell has a spherical shape and is divided into an upper exterior shell containing the air intake opening and a lower exterior shell at least partially containing the flight control circuitry, the one or more propellers, the one or more propeller motors, and the three or more outtake air tubes.

9. The airlifting air tube apparatus of claim 1, wherein the flight control circuitry is further connected to a wireless data transceiver to receive remote-controlled commands from a remote operator.

10. The airlifting air tube apparatus of claim 1, wherein the one or more propellers are a pair or multiple pairs of contra-rotating propellers.

11. The airlifting air tube apparatus of claim 8, wherein the flight control circuitry is installed in a rigid cubby space formed between an outer layer of the lower exterior shell and an inner layer surrounding the air intake path, wherein the rigid cubby space is at least partially isolated from agitated airflow generated by the one or more propellers.

* * * * *